(12) United States Patent
Gillaspie

(10) Patent No.: US 9,804,955 B2
(45) Date of Patent: Oct. 31, 2017

(54) METHOD AND APPARATUS FOR CREATING REFERENCE IMAGES FOR AN AUTOMATED TEST OF SOFTWARE WITH A GRAPHICAL USER INTERFACE

(71) Applicant: TestPlant Europe Ltd, London (GB)

(72) Inventor: Jonathan Gillaspie, Boulder, CO (US)

(73) Assignee: TestPlant Europe Limited, London (GB)

( * ) Notice: Subject to any disclaimer, the term of this patent is extended or adjusted under 35 U.S.C. 154(b) by 0 days.

(21) Appl. No.: 14/811,479

(22) Filed: Jul. 28, 2015

(65) Prior Publication Data
US 2017/0031799 A1   Feb. 2, 2017

(51) Int. Cl.
*G06F 11/36* (2006.01)
*G06K 9/62* (2006.01)
(Continued)

(52) U.S. Cl.
CPC ........ *G06F 11/368* (2013.01); *G06F 11/3664* (2013.01); *G06K 9/4604* (2013.01);
(Continued)

(58) Field of Classification Search
CPC ............... G06F 11/368; G06F 11/3664; G06F 3/04842; G06K 9/4604; G06K 9/4652;
(Continued)

(56) References Cited

U.S. PATENT DOCUMENTS

| 7,039,229 B2 * | 5/2006 | Lin | G06K 9/3241 382/165 |
| 8,151,276 B2 * | 4/2012 | Grechanik | G06F 8/38 717/115 |

(Continued)

FOREIGN PATENT DOCUMENTS

| GB | 2492874 A | 1/2013 |
| WO | 2006132564 A1 | 12/2006 |

(Continued)

OTHER PUBLICATIONS

UKIPO Combined Search and Examination Report dated Sep. 17, 2015, for corresponding application No. GB1515407.3.

*Primary Examiner* — Viva Miller
(74) *Attorney, Agent, or Firm* — Conley Rose, P.C.

(57) ABSTRACT

A method for updating a test description for an automated computer test. The automated test is configured to cause a test computer system to communicate with a system under test comprising one or more computer programs being executed upon a computer device. The test description is configured to be executed by a test program to cause the test computer system to perform an automated computer test by comparing a received image from a GUI of the system under test with one or more reference images to identify an expected image. The method includes receiving a user input representative of the selection of a desired reference image from a GUI of a system under test. The method also includes obtaining the desired reference image by identifying one or more correlations between two or more pixels of the GUI of the system under test to determine a group of pixels corresponding to the desired reference image, determining the image boundaries of the desired reference image based the determined group of pixels and/or any identified correlations, capturing the desired reference image delimited by the determined image boundaries, and updating the test description with the captured reference image and utilizing the updated test description in an automated computer test.

19 Claims, 5 Drawing Sheets

(51) Int. Cl.
    *G06K 9/46*          (2006.01)
    *G06K 9/52*          (2006.01)
    *G06T 7/60*          (2017.01)
    *G06T 7/13*          (2017.01)
    *G06T 7/90*          (2017.01)

(52) U.S. Cl.
    CPC ............. *G06K 9/4652* (2013.01); *G06K 9/52* (2013.01); *G06K 9/6215* (2013.01); *G06T 7/13* (2017.01); *G06T 7/60* (2013.01); *G06T 7/90* (2017.01)

(58) Field of Classification Search
    CPC ...... G06K 9/52; G06K 9/6215; G06T 7/0085; G06T 7/408; G06T 7/60
    See application file for complete search history.

(56) References Cited

U.S. PATENT DOCUMENTS

| | | | | |
|---|---|---|---|---|
| 2005/0094849 | A1* | 5/2005 | Sung | G06K 9/00248 382/103 |
| 2011/0214107 | A1* | 9/2011 | Barmeir | G06F 11/3684 717/125 |
| 2012/0230587 | A1* | 9/2012 | Arseneau | G06F 11/277 382/182 |

FOREIGN PATENT DOCUMENTS

| | | |
|---|---|---|
| WO | 2012154159 A1 | 11/2012 |
| WO | 2013112159 A1 | 8/2013 |
| WO | 2015039585 A1 | 3/2015 |

\* cited by examiner

METHOD AND APPARATUS FOR CREATING REFERENCE IMAGES FOR AN AUTOMATED TEST OF SOFTWARE WITH A GRAPHICAL USER INTERFACE

CROSS-REFERENCE TO RELATED APPLICATIONS

None.

BACKGROUND

Modern software products can be increasingly complex, as can the devices that run these products. The number of different computing devices available on the market is constantly increasing, with consumers requiring smartphones, tablets, smart watches, portable computers as well as the traditional personal computer (PC). To justify the cost of development, and to meet consumer needs, it is often required to roll out a software application across a range of different devices and operating systems. A program developer often has to take into account different operating systems, communication protocols and system hardware when developing new software. As a result, it is often difficult to ensure that a software product is functional across a complete range of devices and operating systems, and that any errors, flaws, failures, or faults (otherwise known as 'bugs') in the software product are identified. Typically, these 'bugs' are only discovered when the software is run. The testing of a software product, pre-launch, is therefore important to a software developer.

SUMMARY

According to a first aspect of the present disclosure there is provided a method for updating a test description for an automated computer test, the automated test being configured, when executed, to cause a test computer system to communicate with a system under test comprising one or more computer programs being executed upon a computer device, wherein the test description is configured to be executed by a test program to cause the test computer system to perform an automated computer test by comparing a received image from a GUI of the system under test with one or more reference images to identify an expected image, wherein the method comprises: a) receiving a user input representative of the selection of a desired reference image from a GUI of a system under test; b) automatically obtaining the desired reference image by: c) identifying one or more correlations between two or more pixels of the GUI of the system under test to determine a group of pixels corresponding to the desired reference image; d) determining the image boundaries of the desired reference image based the determined group of pixels and/or any identified correlations; e) capturing the desired reference image delimited by the determined image boundaries; and f) updating the test description with the captured reference image.

In one embodiment, there is provided a method for updating a test description for an automated computer test, the automated test being configured, when executed, to cause a test computer system to communicate with a system under test comprising one or more computer programs being executed upon a computer device, wherein the test description is configured to be executed by a test program to cause the test computer system to perform an automated computer test by comparing a received image from a GUI of the system under test with one or more reference images to identify an expected image, wherein the method comprises: a) receiving a user input representative of the selection of a desired reference image from a GUI of a system under test; b) automatically obtaining the desired reference image by: c) identifying one or more correlations between two or more pixels of the GUI of the system under test to determine a group of pixels corresponding to the desired reference image; d) determining the image boundaries of the desired reference image based the determined group of pixels and/or any identified correlations; e) capturing the desired reference image delimited by the determined image boundaries; wherein the method further comprises: f) updating the test description with the captured reference image; and g) utilizing the updated test description in an automated computer test.

In one embodiment, in step a) the user input is representative of the selection of at least one pixel of the desired reference image. In one embodiment, step c) further comprises identifying one or more correlations between the at least one selected pixel and one or more adjacent pixels of the GUI to determine the group of pixels corresponding to the desired reference image.

In one embodiment, the correlations comprise one or more of: color correlations; positional correlations; temporal correlations; or empirical correlations. In one embodiment, the color correlations comprise correlations between the color registers of two or more pixels.

In one embodiment, two or more pixels are determined to be correlated if the difference between the values of the color registers for the pixels falls within a predetermined range. In one embodiment, two or more pixels are determined to be correlated if the values of the color registers for those pixels are the same. In one embodiment, the positional correlations comprise geometric correlations and/or pattern-based correlations between two or more pixels. In one embodiment, geometric correlations may comprise one or more of: pixels forming a straight line, pixels forming a rectangle or square; or pixels forming a circle.

In one embodiment, the temporal correlations comprise two or more pixels changing within a pre-defined time period of each other. In one embodiment, the temporal correlations comprise two or more pixels changing substantially simultaneously.

In one embodiment, prior to step c), the method comprises: generating a model of the GUI of the system under test to identify one or more correlations between pixels of the GUI of the system under test.

In one embodiment, the model comprises a direct copy of the GUI of the system under test. In one embodiment, the model comprises a transformation of the GUI of the system under test.

In one embodiment, the transformation may comprise one or more of: a dimensional scaling of the GUI of the system under test; a color transform; a mathematical transform; or a reduced form of the GUI of the system under test.

In one embodiment, a reduced form of the GUI of the system under test may comprise one or more of: the removal of text or removal of borders. In one embodiment, the step of modelling is carried out on the test computer system. In one embodiment, the step of modelling comprises dynamically modelling the pixels of the GUI of the system under test In one embodiment, the method further comprises: g) utilizing the updated test description in an automated computer test.

According to a second aspect of the present disclosure, there is provided a computer readable medium comprising instructions configured when executed to perform the method of the first aspect.

According to a third aspect of the present disclosure, there is provided a computer system comprising: a processing device, a storage device and a computer readable medium of the second aspect.

BRIEF DESCRIPTION OF THE DRAWINGS

Embodiments of the present disclosure will now be described in detail with reference to the accompanying drawings, in which.

DETAILED DESCRIPTION OF DISCLOSED EMBODIMENTS

Figure 1:
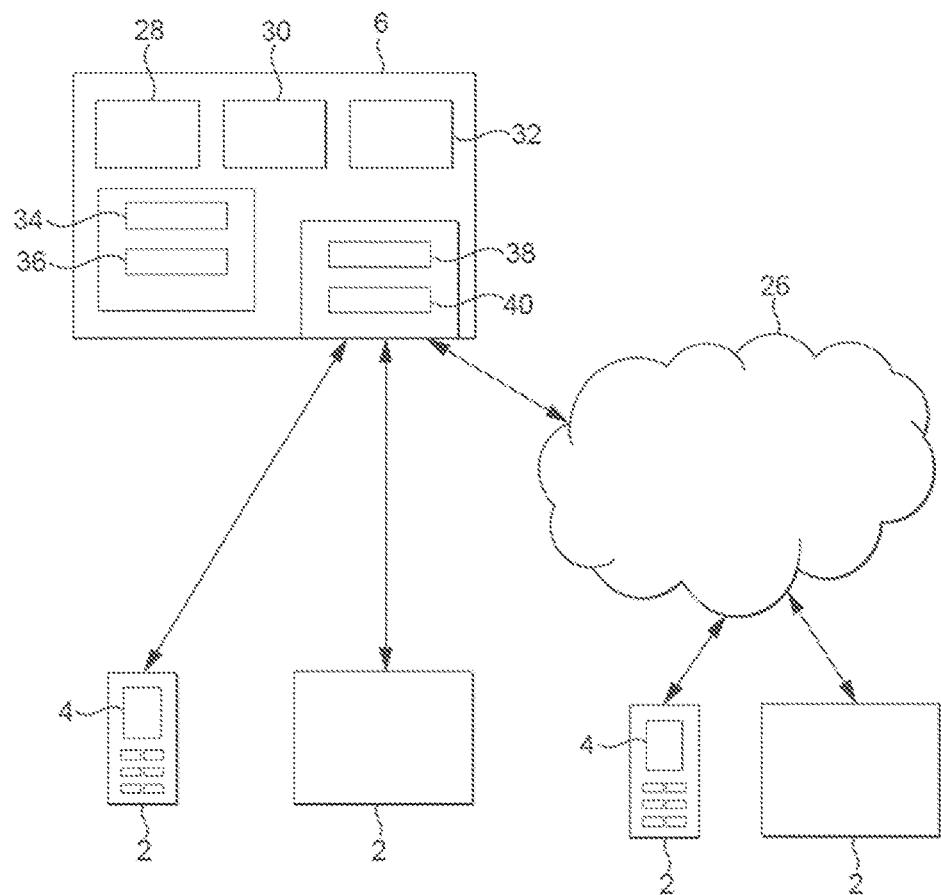
FIG. 1 shows an example of a test computer system that is in communication with several systems under test.

There is presented herein a method for identifying and obtaining reference data for an automated computer test. The methods presented herein may be performed upon the executing of instructions stored upon one or more computer readable media. A system is also provided that is configured to perform the method/s as described herein. Typically the reference data comprises a reference image, but in principle may be any reference data.

Software test engineers commonly test the functionality and behavior of a program both pre and post launch. When performing testing, it is desirable to test out the software in a large number of devices and operating systems to ensure the product is ready for widespread sale for (and can be supported by) all types of computer system. A program which works well on one type of device may experience difficulties running on another type of device. The testing can therefore be a time consuming exercise. Accordingly, the test engineer may want to test multiple devices without having to physically interface with each System Under Test (SUT). Typically the same test will need to be executed a number of different times on the same operating system. Furthermore, when having to perform the same test on a number of different devices, the test engineer would ideally want to run the same sequence of steps without actually having to input each and every step for every test.

One of the most important times to test software is when new versions of the software are released. When such new versions are released, a development team typically creates a "candidate" version of the software. The software testers then test it to find bugs and send the candidate version back to the development team for improvement. The development team then creates a new "candidate." The testers then re-test it to find further bugs and again send it back to development. This loop continues until the software works correctly and it is delivered to customers.

At some further point in time, the development team will typically add some new features to the existing program. The testers then not only have to test the new features, but also that the old features have not 'broken' (i.e. ceased to operate as desired) with the introduction of and/or interaction with the changes. This is called "regression testing." Therefore over the life of a software product, a single test case will be executed 10s, 100s, possibly 1000s of times.

Test programs are known to test the functionality of a SUT. Typically the test program is run upon a computing device or computing system that is remote from the SUT. The computer system running the test program is however in communication with the SUT so that the test program can interact with the SUT. The SUT may be, for example, a PC running a version of Microsoft Word® upon a Windows 7® operating system.

Test programs typically test a SUT by interacting with the SUT and validating the state of the SUT according to an input test description. Test descriptions may also be referred to as automated test descriptions. Test descriptions can take many forms including but not limited to text instructions, software in source code or binary form, work-flows in a diagrammatical form (such as a flow chart). Typically, test descriptions contain lines of text or other characters that when executed by the test program cause the SUT to perform particular actions or execute functions. Therefore executing (or 'running') the test description through the test program allows the system under test to be tested automatically, without requiring a test engineer to provide input to the testing process, other than initiating it.

Some test programs that use automated test descriptions are known. One test program that helps software engineers automate the testing process is 'eggPlant®' by TestPlant®. The eggPlant® software tool allows a user to create and subsequently execute an automated test description to test a large number of SUTs. This test program interacts and controls a SUT by receiving and analyzing images of the SUT Graphical User Interface (GUI).

Test programs such as eggPlant® that utilize GUI images operate by identifying expected objects in a GUI image that relate to executable functions that the test description may wish to identify and interact with or indicate the status of the SUT. Once the expected image object has been identified in the GUI image, the test program description can move to the next step in the test. The identification of the expected image object is performed using image analysis. The image analysis searches the GUI image for the expected image object using an existing reference image that is similar or identical to an expected image object. When a match is found, the expected image object is identified. Examples of image objects may include: an image of a button on the GUI that when 'clicked' would open a dialogue box, or the presence of a particular graphical object that signified the completion of a particular action performed by the target program. The test program may use image analysis techniques to perform these comparisons.

The test description is typically created either manually and/or automatically by a test engineer using the test program. Where commands in the test description require the use of reference images as described above, the user creating the test description manually selects the desired portion of a GUI image (taken from the SUT being tested) using an image selection tool whereby the selected portion of the GUI image is saved as the reference image. Thus, when the test description is completed and subsequently run automatically by the test program to test a further SUT, the same testing steps are performed upon the further SUT.

However, manually selecting the correct images can become time consuming for the test engineer creating the test description, particularly because the test engineer needs to ensure that the correct image selection is made. Erroneous selection of an image which may, for example, contain additional background elements or only a portion of a required image may lead to erroneous test failures when the correct image cannot be identified, or is incorrectly rejected or mis-identified.

Therefore, a technical problem may arise that a user may not select the most appropriate or accurate graphical representation of an image when generating a test description. Therefore the image analysis to identify the expected image object using an existing reference image may fail unexpectedly or erroneously.

The present disclosure relates to a method of, and apparatus for, creating reference images for use with a computer test description for testing of computer programs such as software applications. More particularly, the present disclosure relates to a method of, and apparatus for, automatically selecting an appropriate reference image based on a user selection.

The SUT and Test System

The automated test is configured when executed, to cause a test computer system 6 to communicate with a SUT 2. This is achieved through transfer of data, either directly or indirectly, between the SUT 2 and the test computer system 6. Data may be communicated in any suitable manner, i.e. data may be sent directly or indirectly from the test computer system 6 to the SUT 2 and/or data may be sent directly or indirectly from the SUT 2 to the test computer system 6.

By communicating with the SUT 2, the test computer system is operable to interact with the SUT, for example by receiving GUI 4 images and/or sending commands to control the SUT. The automated test description is typically configured, when executed by a test program, to test the functionality and/or behavior of a SUT. A test computer 6 communicable with several SUTs 2 is shown in FIG. 1.

The term "test description" may also be termed throughout the application as an "automated test description."

Typically, a "test description" 24 forms part of an "automated test." The test description 24 is typically lines 62 of text or other characters that typically contain instructions, that when executed by the test program, cause the SUT 2 to perform particular actions or execute functions. An instruction in the description 24 can include one or more standard commands and/or one or more other pieces of information or data. For example, the command "Typetext" may be followed by the words "This is a test." The test program running the automated test would execute the standard command "Typetext" to cause the SUT 2 to type the words "This is a test" into a particular text entry box on the SUT GUI 4.

The automated test may have further metadata associated with the description. Such metadata may be, an image associated with a particular instruction in the description. The test may be stored using one or more storage device or computer readable media as described herein.

For the purposes of this application, when reference is made to the test program running the test description, this is taken to mean the running of the automated test.

The SUT 2 comprises one or more computer programs being executed upon a computer device.

The SUT 2 may be remote from the test computer system 6. The term 'remote' is intended to mean that the computer system or device is physically separate to the test computer system 6 such that when the test computer system and remote computer system interact, one or more transmitter and receiver devices are used to send and receive data over one or more communication channels. The communication channel may be any suitable channel using any of electrical, electromagnetic or optical signals.

Figure 2:
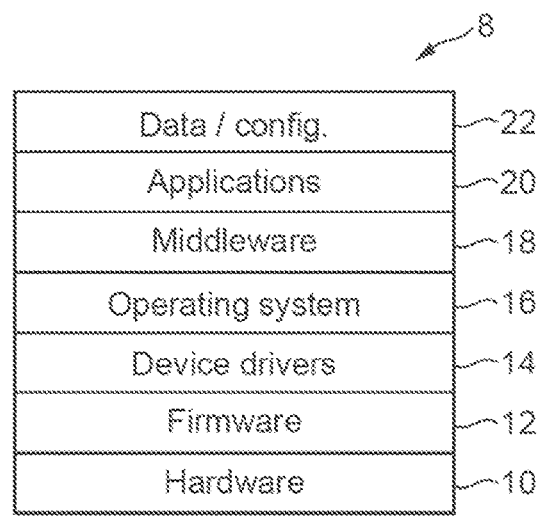
FIG. 2 shows an example of a hardware/software stack model representation for a system under test.

The SUT 2 can be any computing system or device running one or more computer programs. FIG. 2 shows an example model of a hardware/software stack 8 for a SUT 2. The test computer system 6 can control features or aspects of any of these layers by interacting with the SUT 2. The SUT 2 in principle can include any one or more parts of the hardware/software stack 8 of the system being tested 2, i.e. the hardware 10, firmware 12, device drivers 14, operating system 16, middleware 18, applications 20 and data/config 22. Typically a SUT 2 will at least comprise hardware 10 and an operating system 16. FIG. 2 is only an example of a hardware/software stack model 8. Other models with further details and layers may also be used to define a SUT 2. The term 'computer program' is taken to mean any of (but not necessarily limited to) an application program 20, middleware 18, an operating system 16, firmware 12 or device drivers 14 or any other medium supporting executable program code.

The term 'hardware' 10 is taken to mean any one or more of the collection of physical elements that constitutes a computer system/device such as, but not limited to, a processor, memory device, communication ports, input/output devices. The term 'firmware' 12 is taken to mean any persistent memory and the program code/data stored within it, such as but not limited to, an embedded system. The term 'device drivers' 14 is taken to mean the one or more programs that operate to control a particular type of device incorporated into or attached to the computer device/system. The term 'operating system' 16 is taken to mean the one or more pieces, often a collection, of software that manages computer hardware and provides common services for computer programs. The term 'middleware' 18 is taken to mean the computer software that provides services to software applications beyond those available from the operating system 16. The term "applications" 20 is taken to mean the computer software that causes a computing device or system to perform tasks that are typically beyond the running of the computer itself. The term 'data/config.' 22 is taken to be any other information provided to the SUT 2 that can be used to affect its running or output, for example data input into the application program 20.

A SUT 2 may comprise a different physical device to another SUT 2 as shown in FIG. 1. For example, the SUTs may be different physical computing devices running the same application program 20 using the same or different application program 20.

Alternatively, a SUT 2 may differ from another SUT 2 simply by running a different operating system 16 and/or different version of one or more application programs 20. For example, a first SUT 2 may be a PC (i.e. the computer hardware) running an operating system 16 and a first version of an application program 20, whereas a second SUT 2 may be the same hardware 10 as the first SUT 2, running the same type and version of the operating system 16 but running a second, updated version of the application program 20. In principle, one SUT 2 may differ from another SUT 2 by virtue of any different hardware/software configuration. For example any change in any one or more of the layers in the stack 8 of FIG. 1 from hardware 10 to application program 20, may give rise to a different SUT 2.

Typically when the test computer device interacts with the SUT 2, it does so using a test program that executes the test description 24. Typically the test program is hosted on the test computer system 6. The description 24, when run (executed) by the test program, typically causes the SUT 2 to be controlled by the test computer system 6. For example, a line in the test description 24 run by the test program with the phrase "click button X" will cause button 'X' on the GUI 4 of the SUT 2 to be selected and the operation associated with the selection of that button to be started upon the SUT 2.

FIG. 1 shows an example of a test computer system 6 in communication with a number of SUTs 2. Two SUTs 2 are in direct communication with the test computer system 6, for example using infrared or Bluetooth communications, or over a local wired or wireless network, whilst two other SUTs are in communication with the test computer system 6 via the internet 26.

The test computer device/system 6 may be any suitable computer device, system, collection of computing devices or collections of computing systems. The test computer system 6 may, in non-limiting examples, comprise any one or more of: one or more processors 28; one or more controller devices 30; one or more memory devices 32; one or more user input devices 36; one or more output devices 34 such as, but not limited to, a GUI; one or more communication devices such as a transmitter 38 and/or a receiver device 40.

Any one or more of the processor 28, controller 30, receiver 40, transmitter 38, or memory 32 may be a physical, non-transitory, device or apparatus. The devices/apparatus may be electronic, opto-electronic or optical.

The processor 28 may, in principle, be any suitable processing device such as, but not limited to, a microprocessor, an application-specific instruction-set processor, a graphics processing unit (GPU/VPU), a physics processing unit (PPU), a digital signal processor, a network processor, a front end processor. Examples of processors include, but are not limited to, an Intel® processor, an AMD® processor.

The controller 30 may be any suitable controller including any one or more of a controller chip, a controller board, a mainframe controller, an external controller or any other suitable controller. The controller may be, for example, a micro-controller.

The memory 32 may, in principle be any suitable memory including any one or more of: mechanical memory such as, but not limited to, magnetic tape drive, hard-drive, optical drive; volatile and non-volatile memory such as, but not limited to, RAM, DRAM, SRAM, SDRAM, T-RAM, Z-RAM, TTRAM, ROM, Mask ROM, PROM, EPROM, EEPROM, NVRAM.

Figure 3:
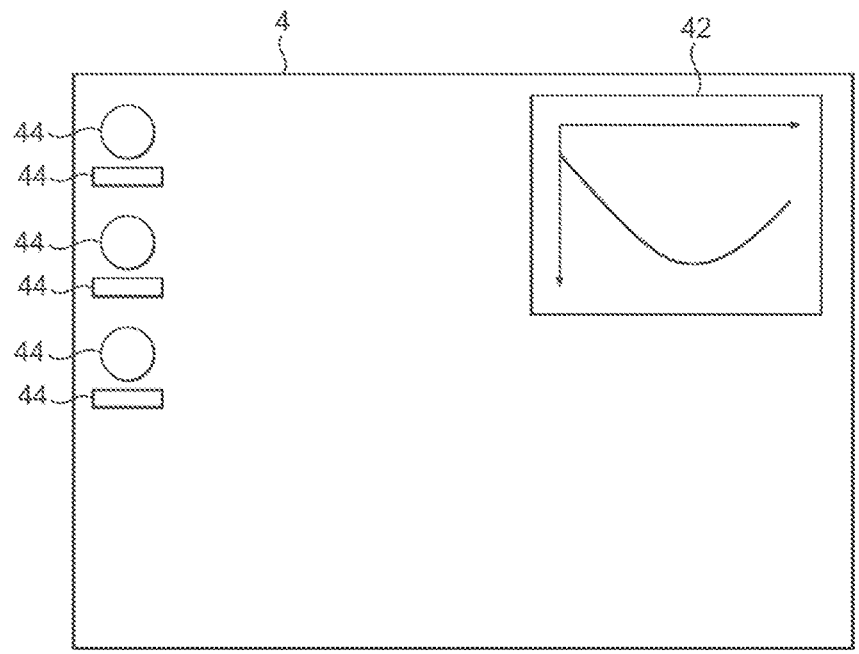
FIG. 3 shows an example of a GUI for a system under test.
Figure 4:
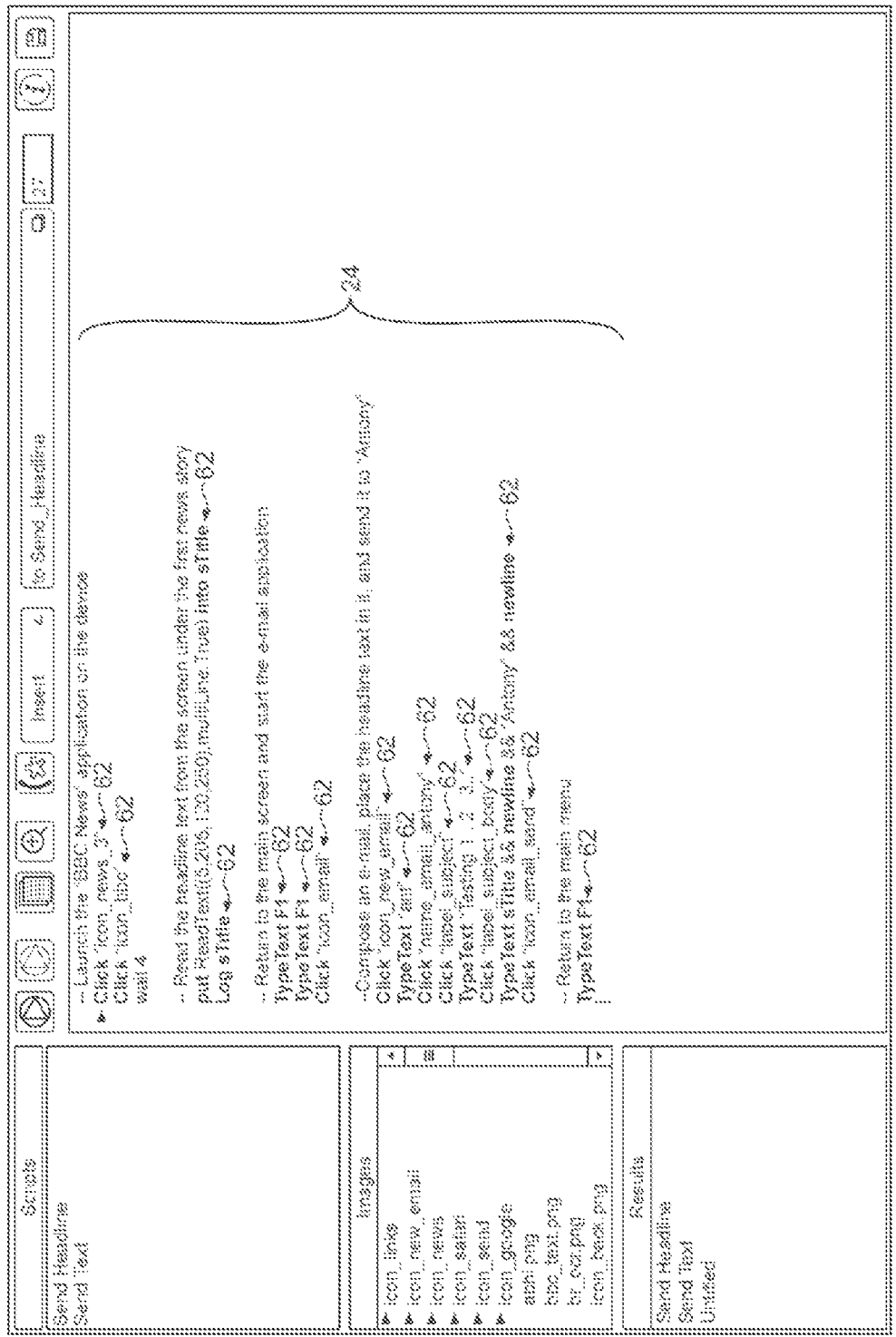
FIG. 4 shows an example of a test description.

FIG. 3 shows an example of a test description 24 run within a test program. The test description 24 comprises multiple lines of text, numbers or other symbols that are typically executed by the test program in a sequential manner.

The description 24 may be written in any suitable scripting language, for example SenseTalk®. Preferably the description is loadable onto a carrier device such as a disc, memory stick or any other suitable electronic data carrier.

The test program may utilize one or more GUI 4 images received directly or indirectly from the SUT 2. FIG. 2 shows an example of this. Typically the GUI 4 images are "snapshots" of the output of the GUI 4 of the SUT 2 at a particular time. Typically these snapshots are saved as a graphical image file, for example a bitmap, gif or jpeg file. The GUI 4 images may be a snapshot of the whole GUI 4 or one or more portions of the GUI 4. GUI snapshots may be only portions of the GUI image that have changed since a previous GUI image was sent.

In non-limiting examples, a test program is used to execute the test description 24. However, the functionality required to execute the test description 24 may be hosted by an operating system or any other software or dedicated hardware, for example the test description 24 may be a standalone executable file itself.

The SUT 2 may send these GUI images to the test computer system 6 automatically upon an initial command to start sending the images. Additionally or alternatively the SUT 2 may send one or more GUI images upon a command sent from the test computer system 6. Additionally or alternatively the SUT 2 may send one or more GUI images upon a command sent to the SUT 2 resulting from an instruction from the test program, and/or the test description 24.

The GUI images may be sent continuously by the SUT 2 at a particular update frequency, for example the SUT 2 may send a new GUI image to the test computer every 0.3 seconds. It may not be necessary to send the entirety of the GUI image or images in an update. For example, in an embodiment, only the pixels of the GUI image which have changed since the last update may be sent.

The GUI images provided in the image updates according to the example above and any of the methods/systems described herein, may in principle be one or more images. The images may be rectangular or take any other shape and be in any image format such as '.bmp,' '.jpeg', '.png' file format.

The GUI images received from the SUT 2 may be stored by one or more memory elements 32. The memory elements 32 may be housed within and/or are part of the test computer system 6. Additionally or alternatively one or more memory elements may be housed remotely from, but in communication with, the test computer system 6.

Typically, at a given line in the description 24, the test computer/program will select the latest GUI image stored by the memory element and perform an image analysis on the GUI image to find a particular reference or "expected" image. The expected image may be the whole GUI image or one or more parts of the GUI image.

The GUI image that the test computer 6 compares, to find the expected image may, in some situations, only include the one or more sub section/s of the GUI 4 output most recently sent by the latest GUI image update from the SUT 2. Alternatively, the GUI image that is compared may be a composite image based upon all the GUI images sent by the SUT 2 that represent the current whole GUI 4 output.

Figure 6:
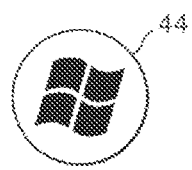
FIG. 6 shows an alternative expected image object.

The expected image may be an image that indicates a particular action has been accomplished by the SUT, for example, the expected image may be part of a dialogue box. The expected image may be an image that represents an interactive feature on the GUI of the SUT that the test program wishes to utilize. For example a round button 44 as shown in FIG. 6, which when selected and activated on the SUT GUI 4 will cause a pop-up menu to appear that the test program can then further utilize in the testing of the SUT 2. The expected image may be the whole GUI image or one or more parts of the GUI image.

When performing the image analysis to identify the expected image, the test program uses existing reference images that are associated with the expected graphical make-up of the expected image. Typically these reference images will be similar or identical to the expected image such that the test program can search the GUI image for a graphic similar to or identical with the reference image.

The test program may utilize various methods of performing this image analysis and may try to 'match' the reference image to at least a portion of the GUI image/s using any suitable image analysis technique. This may include, for example, having to re-size or rotate the reference image to find a match.

Expected images contained within the GUI image may be associated with "events" that are activate-able within the SUT 2 as discussed above. For example the reference images of the start buttons 42, 44 shown in FIGS. 5 and 6 respectively. These "events" may be utilized by the test program. Each event is executable in the SUT 2 by the selection of a particular one or more activating pixels or "hotspots." The hotspots may be within the expected image or outside of the expected image. For example, in FIG. 5, the hotspot may be one of the pixels making up the 'a' of the word "Start."

In embodiments, the reference images are selected by the test programmer in dependence upon the desired output or test to be run. For example, a test description may be arranged to click on a "Start" button on a Windows 7 system and look for a specific menu item or configuration to appear.

The test programmer then selects a reference image based upon the desired script item and to represent a correct output from a test action, e.g. a mouse click on a "Start" button.

Conventionally, the test programmer would select the desired image manually by, for example, drawing a selection box around the image to be captured as a reference or expected image. However, in many cases, this process may be lengthy and inaccurate. For example, the test programmer may draw a box around only part of the desired reference image, or may include other elements in the selected image in addition to the desired reference image. For example, the test programmer may unwittingly include part of a background image as part of the desired reference image. This may then lead to erroneous test failures where an expected image is not found because the expected image itself contains extraneous features which cause the test to fail.

Alternatively, a selection of only a part of the reference image may also lead to erroneous failures, particularly if a scaling or other transformation of the reference image is required.

The method described herein creates a reference image by utilizing modelling methods and/or metadata relating to the desired reference image selected by the test programmer and/or modelling the GUI of the SUT 2 to determine regions of interest for capturing a reference image.

A processing device is then used to determine and create the desired reference image using the metadata. The metadata enables the method to select the appropriate region. This created reference image is then stored using a storage device and may then be used by the test program to compare against GUI images received from the same SUT or a different SUT to determine test passes or test failures. The method described herein may create one or more references image from the metadata and/or modelling process. The method may create one or more reference images for the whole test description 24 or part of the test description 24.

Figure 7:
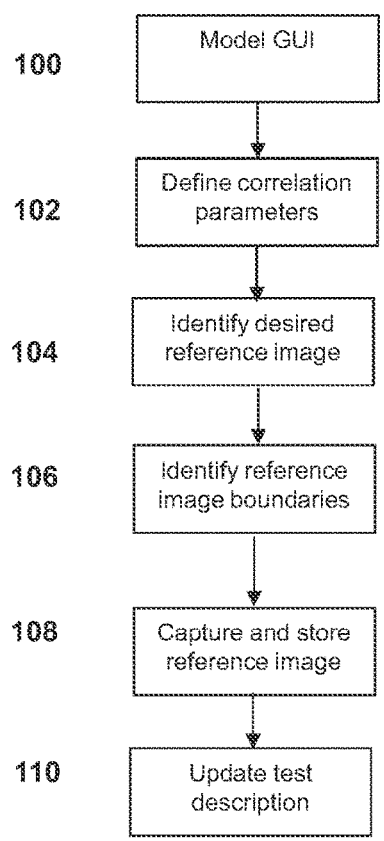
FIG. 7 shows a flow chart in accordance with an embodiment of the present disclosure.

A method according to an embodiment of the present disclosure is described with reference to FIG. 7. FIG. 7 shows a flow chart of an embodiment of the present method.

Step 100: Model GUI

During the process of updating the test description to include new or modified data, the test program maintains an exact copy of the GUI of the SUT 2 on the test computer system. The test program obtains metadata on the GUI to enable accurate selection of reference images to form the test description.

In this embodiment, the metadata is obtained from a modelling process and is utilized to identify automatically the correct boundaries of a reference image which is indicated by the user. The modelling process generates a virtual representation of the GUI of a SUT 2. This is, in this embodiment, additional to the conventional copy of the GUI on the test computer 6 which is used by the test engineer to select reference images. In other words, the modelling process determines metadata or data relating to the boundary of the desired image to be selected by the test programmer. This data/metadata is then used to select the boundaries of the desired reference image on the copy of the GUI running on the test computer system 6.

However, this is not to be taken as limiting and the skilled person would understand that variations and other implementations could be used. For example, the metadata and/or data for carrying out the method could be obtained directly from the copy of the GUI of the SUT 2 running on the test computer 6 as described later.

The metadata associated with the expected image and can come from, but is not limited to, any information associated with any of the layers in the software/hardware stack 8 as shown in FIG. 2. The metadata would typically be data or information that would directly, or indirectly, have an input upon, or otherwise be indicative of, an aspect of the outputting of the expected image. The outputting of the expected image may cover any one or more of a graphical aspect of the expected image, an absolute or relative position of the expected image within a GUI image, an absolute or relative timing of the output of the expected image or any other output related data.

In this embodiment, the method obtains metadata through the use of a model of the GUI of a SUT 2. A GUI of a SUT 2 may be modelled on a pixel-by-pixel basis to generate a model of the GUI on the test computer system 6 or on a computer system local to the test computer system 6. The GUI of the SUT 2 may be modelled dynamically. In other words, it may be modelled as a function of time as well as the two spatial dimension coordinate axes.

In this embodiment, the modelling process involves utilization of a virtual representation of the GUI of the SUT 2. The virtual representation may simply be a direct copy of the GUI of the SUT 2 which is generated on the test computer system 6 or on another computer connected to the test computer system 6. The model (or copy) may be updated at set intervals or in real time to reflect changes on the GUI of the SUT 2. This may be done in a number of ways. For example, a new screen capture of the GUI may be taken at specific intervals or in a continuous update (for example, at an update equal to the refresh rate of the GUI of the SUT 2) to generate a virtual representation of the GUI of the SUT 2.

Alternatively, the update process may involve only modifying the pixels of the virtual representation/model corresponding to pixels which have changed on the GUI of the SUT 2 since the last update or refresh. A log of these changes may be stored and referenced if required. However, these approaches are non-limiting and the skilled person would be aware of alternatives or variations which could be implemented.

Alternatively or additionally, the virtual representation or model of the GUI of the SUT 2 need not be a direct copy of the GUI itself. The virtual representation may comprise a transformation of the GUI of the SUT 2 in some manner. For example, the virtual representation/model may comprise a dimensional scaling of the GUI of the SUT 2.

Alternatively or additionally, the virtual representation may comprise a transformation of the GUI of the SUT 2 according to one or more pre-determined filters. The pre-determined filters may comprise a color transform (e.g. to render the virtual representation black and white or gray-scale), a mathematical operation (e.g. an anti-aliasing transformation or Moiré reduction function), or addition or removal of particular GUI elements (e.g. all or selected text could be removed from the GUI or elements could be added such as a grid formation or other marking elements).

Alternatively or additionally, the virtual representation may be transformed may comprise a transformation of the GUI of the SUT 2 according to one or more pre-determined operators or metadata. These operators may involve particular pre-determined or dynamically-generated operators which modify, for example, the color mapping, geometry, luminance levels, text, borders or dimensions of the GUI obtained from the SUT 2 when generating the virtual representation. For example, if the pre-determined operator comprises a color or brightness operator, this may involve modifying the entirety of, or particular regions or elements of, the GUI in accordance with a color mapping to switch particular colors or highlight particular regions of the GUI.

The model may not be directly visually represented to the test programmer. In this arrangement, the model is operable to enable accurate selection of image boundaries and this is done when the test programmer clicks on a given image or region. The model is effectively "invisible" to the test programmer in this example.

However, alternatively, the model may be displayed to the test programmer in some form. In non-limiting examples, the visual representation of the model (in, for example, a overlaid window or on a separate display screen) may be useful to a test programmer to determine whether the model is correctly identifying the boundaries of a particular image. This may, for example, be called up by the test programmer if required.

Alternatively or additionally, the virtual representation may be a non-visual representation of the GUI where each pixel of the GUI of the SUT 2 is represented by some property thereof. For example, each pixel may be represented by one or more of: pixel coordinates (either in X or Y coordinates or in raster scan order); time since a pixel has changed; or chrominance or luminance values.

In each case (i.e. with or without a transform), the virtual representation of the GUI comprises data or metadata comprising information relating to the spatial location of each GUI pixel relative to the other pixels (i.e. pixel coordinates), the chromatic and intensity properties of the pixel (i.e. the color and brightness of the pixel) and the temporal evolution of the pixel properties (i.e. how the color and brightness of the pixel changes as a function of time). These properties can be used to determine correlations between pixels as set out in step 102 below.

In addition, the properties of groups of pixels may be considered in addition to or as an alternative to considering individual pixels. This may be important when, for example, considering a common structure between pixels (e.g. straight lines, borders or common image structures within a group of pixels). The method proceeds to step 102.

Step 102: Define Correlation Parameters

Figure 5:
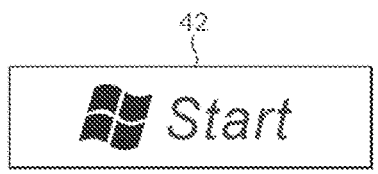
FIG. 5 shows an example of an expected image object.

The modelling of the pixel properties enables accurate identification of a desired reference image. The reference image will, in general, be comprised of a group of pixels associated in some manner. These correlations can be defined and utilized to identify particular image groups comprising a desired reference image. The desired reference image may be, for example, a start button as shown in FIG. 5 or 6, or another icon or symbol.

For example, the group of pixels forming the reference image may be the same or a similar color, or at least a different color from the background color or background image upon which the desired group of pixels are placed. This correlation can be utilized to identify the boundaries of a desired reference image.

The variation in color may be defined according to some threshold. At a first threshold level, pixels sharing the same color may be identified. If no viable correlation is found at this level, then a second threshold level may be applied. For example, a variation in either Red, Green or Blue color registers within a particular range may be used to determine a correlation. As a further example, a variation in either Red, Green or Blue color registers of a particular amount may also be used such that contrasting regions can be identified which may be potential candidate for border regions between pixels within an identified group and pixels lying outside that border group.

Alternatively or additionally, the intensity of the desired group of pixels forming the desired reference image may be different from the background, e.g. to highlight the particular group of pixels. This correlation can also be utilized to identify the boundaries of a desired reference image. Again this may be specified in the form of a threshold between intensity levels of a particular pixel within an identified group when compared to neighboring pixels outside of that group.

Alternatively or additionally, the group of pixels may be associated through "structural" variations. For example, the group may comprise pixels arranged in particular geometry (e.g. straight lines or a grid formation) or sharing particular characteristics (e.g. a particular repeated pattern). Differences between the pixel structure of particular regions may also form correlation parameters. For example, a patterned region surrounded by a flat color may indicate the presence of an icon and the boundary of the icon could be detected thereby.

Alternatively or additionally, the correlation parameters may comprise pre-defined structures or patterns based on dynamically-generated or pre-determined parameters or metadata. For example, groups of pixels forming a non-filled rectangle may be determined to be associated and therefore candidates for identifying border regions.

Alternatively or additionally, pre-defined parameters may include particular definitions of button or other icon sizes (e.g. the standard sized rectangular icons in an Apple iOS display) based on pre-determined empirical knowledge. This may also apply to, for example, the Windows OS where pre-determined empirical knowledge of the format of a Windows GUI (e.g. menu bar, Start icon, icon placement etc.) could be used as an correlation parameter.

These parameters may also be dynamically defined or may utilize external input. For example, Windows theme information (e.g. background design/color, menu bar transparency and icon structure) could be imported and utilized as an correlation parameter in the present method.

As a further alternative, the group of pixels may be associated temporally, i.e. they may all change as a group when an action is carried out. Such an action may be, for example, clicking on an icon, or a "live" or animated group of pixels such as an animated "widget" present in Android and/or Windows platforms. As before, this correlation can be utilized to identify the boundaries of a desired reference image. This may be done utilizing the model described above in step 100 whereby a log of pixel changes as a function of time is stored and can be used to identify pixel groups for boundary determination.

All three techniques (plus additional techniques if desired) may be used together if required to provide confirmation, or may be used individually as appropriate. The method proceeds to step 104.

Step 104: Identify Desired Reference Image

Once the modelling of the GUI of the SUT 2 is complete and the necessary correlation parameters defined, reference images can be selected by the user and added to the test description to form part of an automated test.

At step 104, the test programmer selects the desired reference image using the copy of the GUI on the test computer system 6. Consider an example of the test programmer wishing to select an icon as a desired reference image.

The programmer may identify the desired reference object (the icon) to the program in a number of ways. For example, the desired reference object may be identified by a simple selection (e.g. a mouse click or touchscreen press) within the region defined by the icon. Alternatively, the icon may be selected in different ways—for example, if a cursor is held over the icon in a stationary manner for a predetermined amount of time.

As a further alternative, the test programmer need not select the icon directly. Instead, a selection (e.g. mouse click or touchscreen press) in the vicinity of the icon may prompt the identification of the nearest suitable reference object (i.e. the icon) by the method.

Alternatively or additionally, the icon may be selected by highlighting, selecting or hovering a cursor or mouse pointer over any text associated with the icon.

The above are only non-limiting examples of such a selection process. The skilled person would be readily aware of variations and alternatives that fall within the scope of the present application. The method proceeds to step 106.

Step 106: Identify Reference Image Boundaries

Once the reference image (in this example, the icon) is selected by the test programmer, the method then proceeds to identify the boundaries of the reference image to be selected as a reference image.

This may be done in numerous ways. However, in non-limiting examples, the method identifies the reference image (e.g. the icon) using the correlation parameters defined in step 102. In other words, the desired reference image is identified as a group of pixels which are associated through visual properties (e.g. chrominance, luminosity), structural properties (e.g. particular patterns or pixel structures) or temporally (e.g. do particular groups of pixels change their properties at once).

An example of this is described with reference to identification of an icon. The icon may be a single color, or a group of colors which are different from the background. For example, a red and white icon located on a blue Windows background. The method of the present disclosure, through the use of correlation parameters, is operable to identify the boundaries of the icon based on these color differences. On a monochrome screen, or on a color screen displaying only a monochrome output (e.g. the power saving mode now common in smartphones), the icon may potentially be identified based on luminance or brightness variations of the group of pixels forming the icon when compared to the background.

The icon may also have particular structural properties. For example, the icon may be of fixed spatial dimensions (for example, the standard icon size in Apple, Windows and/or Android products) or may contain structure indicative of a set of grouped pixels (such as, for example, a black border, "three-dimensional" effect shading or other arrangements). These elements can be utilized to define structural correlations between graphical elements.

Further, the group of pixels forming the icon may be identified by means of their temporal evolution as a group. For example, when an icon is selected or highlighted by a user, the icon may change in some way. For example, it may change form, color or brightness, it may relate to a different image (e.g. the closed and open envelopes to signal a read or unread email message) or it may move across the screen. The method of the present disclosure is operable to identify the icon as a desired reference object based on the common temporal evolution of the group of pixels forming the icon with respect to other regions of the screen.

The method of the present disclosure enables accurate identification of the image boundaries of a desired reference image such as an icon or other group of associated pixels through at least one of the above processes. Each of the above processes may, as described above, be capable of identifying the reference image region accurately.

However, when taken in combination, the accuracy of the method is improved. Consider the example of the icon above. A red and white icon on a red or multi-colored background may prove more challenging to identify, particularly if the icon is arranged to appear at least partially transparent so that the background can be seen therethrough. In this situation, the identification of associated visual properties of the group of pixels based on color may not be accurate.

Alternatively, if the background is structured or patterned in a particular way that is similar or the same as the icon, or if, again, the icon is arranged to appear at least partially transparent, then the identification of the image boundaries of the icon based purely on structural identifiers may not be accurate.

However, by combining all three (or more) methods, the image boundaries of the group of pixels forming the icon (and to be utilized as a reference image) can be identified with high accuracy, with at least one method providing a positive result and, in many cases, more than one method providing confirmation of the correct image boundary for the icon.

A further example will now be described. Consider a situation where a test programmer selects a blue pixel on the copy of the GUI running on the local test computer system 6. Utilizing the correlation parameters, adjacent pixels having the same blue color can be identified, ignoring any associated text. On this basis, the boundary of the object the user is attempting to select can be identified.

Then, other correlation parameters can be applied to confirm the boundary selection. For example, the boundary identified on the basis of color correlation could be confirmed by reference to pre-determined empirical parameters which compare the boundary to a known shape in the GUI OS. This may be, for example, a rectangle (optionally having particular dimensions in accordance with the OS format). It may be identified whether any text is associated with the rectangle, and where that text is located. For example, an empirical correlation parameter may be that rectangular icons optionally have text displayed directly below.

On this basis, by combining multiple correlation parameters, the boundary of a desired reference image can be correctly identified. Once the image boundaries have been identified, the method proceeds to step 108.

Step 108: Capture and Store Reference Image

Once the identification of the group of pixels forming the icon has been performed in step 106, the group of pixels to form the accurate reference image can be captured and then stored to memory elements 32 or another storage device as part of the test description 24.

When identified, the user may be presented with a text box to name the reference image. Alternatively, a name for the reference image may be automatically selected based on particular criteria of the environment surrounding the obtained reference image or metadata thereon.

In addition to the above, the modelling of the pixels and GUI may be done on a number of different GUIs. In this manner, metadata on particular icon or groups of pixels may be built up to enhance the validation process and enable identification of boundaries of images more readily.

As a further, optional step, the user/test programmer may have the option to review the captured image prior to the image being saved as part of a test description. The test programmer can then modify the captured image as required—for example, the test programmer may wish to crop the image, translate it (e.g. move it left or right) or change the "hotspot" location allocated to that image. The method then proceeds to step 110.

Step 110: Update Test Description

Once the desired reference image has been captured, the test description 24 can be updated to include the new reference image. In the present disclosure, the term "updating" is used to refer to the modification of a test description to include new, changed or otherwise modified elements. This may include, for example, a command line or instruction being added to a new test description as it is being created. Alternatively, it may include the modification or reconfiguration of an existing test description.

If the test description is in the process of being created, there may not be any previous reference images. However, if any reference images do exist, the new reference image may, optionally, replace an existing reference image or images. Alternatively, the new reference image may be added as a second reference image in addition to an existing reference image.

Once the process of updating has been carried out in step 110, the test description may then be used as part of an automated test having improved reliability and reduced erroneous failure rate due to incorrect reference image capture.

As set out above, the present disclosure offers the possibility of certain advantages over known arrangements. Consider the example of the selection of an icon for a reference image. Conventionally, the test programmer would need to draw a box around the icon to select the icon, and then confirm the selection, before providing a name for the icon. However, the selection process may result in an incorrect or inaccurate image capture which could lead to an inaccurate or error-prone reference image.

The method of the present disclosure not only automates and expedites the production of a test description 24, but also provides an updated test description 24 which is more robust and reliable than a test description developed using conventional techniques. The improved test description 24 formed by the method of the present disclosure is, as a result, more reliable and less prone to erroneous failures than known arrangements, providing an opportunity for a technical advantage over known arrangements.

Figure 8:
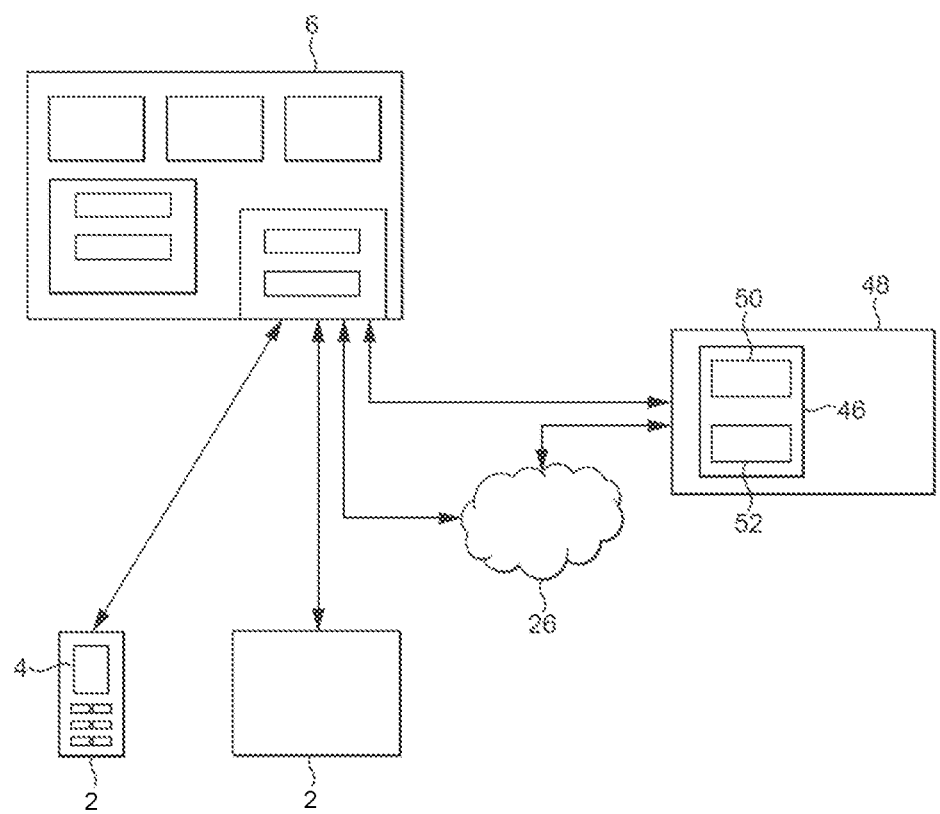
FIG. 8 shows an example of a test computer system in communication with several systems under test and a remote server comprising a database.

FIG. 8 shows an example of a system using the method as described herein where reference images are stored upon an external memory/storage device that is remote from the test computer system.

The external device may be a central server or other computer system with access to one or more communication devices such that one or multiple test computer systems 6 can send or retrieve reference images to/from the server.

The server may operate one or more databases or other information handling systems on one or more memory devices. The databases may store multiple different reference images. One database 50, or a part of one or more databases, may be available to all test computer systems 6 or a set of one or more test computer systems and store reference images generated from those test computer systems 6. The test systems 6 with access to that database 50 may therefore be able to access the reference images created by other test computer systems 6. This may be beneficial, for example, where different companies that make software applications 20 (and test them using a test system as described) need to update reference images because of a new change in a common operating system 16 that their application programs 20 run upon. If a first user creates reference images according to any of the methods described herein and stores them on the database 50, then other users can subsequently use the same reference images by retrieving them from the same accessible database 50, therefore saving processing time.

Additionally or alternatively the server 48 may model the GUI and enable rapid selection of accurate reference images itself using any of the methods described herein and make them available to those systems accessing the database 50. In addition, the process may be optimized to learn such that reference images stored upon the database 50 can be analyzed for common themes and metadata based on the analysis developed to assist the modelling process. The server 48 may comprise hardware elements similar to those described for the test computer system 6.

The server may also comprise restricted database records 52 that only one or a select subset of test computers 6 or users can access. This may be useful, for example, where a particular company is testing a new version of its own software 20 and does not want others outside its organization to see its new images prior to release of the software 20.

Embodiments of the present disclosure have been described with particular reference to the examples illustrated. However, it will be appreciated that variations and modifications may be made to the examples described within the scope of the present disclosure.

For example, the modelling step 100 may be carried out without the generation of a virtual representation as described above. For example, the determination of correlation parameters and/or detection of boundaries may be done directly on the GUI of the SUT 2 itself without the need to generate a model.

Alternatively or additionally, the correlation parameters could be generated in advance by running a "training mode" prior to the user selection in step 104. This could be done on either the GUI itself or a virtual representation thereof. A training mode may, for example, generate an action (e.g. a mouse click or a touch event) at every point, or on specific points (e.g. on a grid) of the GUI and the responses recorded. Color, brightness, structural and temporal data on the GUI could then be stored to provide a database of possible image candidates with predefined boundaries. Then, when the user clicks on a particular region of the screen to select an icon or other object, that region can be associated with a predefined image boundary and the method can proceed on that basis.

The methods described herein may be embodied in one or more pieces of software. The software is preferably held or otherwise encoded upon a memory device such as, but not limited to, any one or more of, a hard disk drive, RAM, ROM, solid state memory or other suitable memory device or component configured to software. The methods may be realized by executing/running the software. Additionally or alternatively, the methods may be hardware encoded.

The method encoded in software or hardware is preferably executed using one or more processors. The memory and/or hardware and/or processors are preferably comprised as, at least part of, one or more servers and/or other suitable computing systems.

The above discussion is meant to be illustrative of certain principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method for updating a test description for an automated computer test, the automated test being configured, when executed, to cause a test computer system to communicate with a system under test comprising one or more computer programs being executed upon a computer device, wherein the test description is configured to be executed by a test program to cause the test computer system to perform an automated computer test by comparing a received image from a GUI of the system under test with one or more reference images to identify an expected image, wherein the method comprises:
    a) receiving a user input representative of the selection of at least one pixel of a desired reference image from a GUI of a system under test; and
    b) automatically obtaining the desired reference image by:
    c) identifying one or more correlations between the at least one selected pixel and one or more adjacent pixels of the GUI of the system under test to determine a group of pixels corresponding to the desired reference image;
    d) determining the image boundaries of the desired reference image based the determined group of pixels and/or any identified correlations;
    e) capturing the desired reference image delimited by the determined image boundaries; and
    f) updating the test description with the captured reference image.

2. A method according to claim 1, wherein the correlations comprise one or more of: color correlations; positional correlations; temporal correlations; or empirical correlations.

3. A method according to claim 2, wherein the color correlations comprise correlations between the color registers of two or more pixels.

4. A method according to claim 3, wherein two or more pixels are determined to be correlated if the difference between the values of the color registers for the pixels falls within a predetermined range.

5. A method according to claim 4, wherein two or more pixels are determined to be correlated if the values of the color registers for those pixels are the same.

6. A method according to claim 2, wherein the positional correlations comprise geometric correlations and/or pattern-based correlations between two or more pixels.

7. A method according to claim 6, wherein geometric correlations may comprise one or more of: pixels forming a straight line, pixels forming a rectangle or square; or pixels forming a circle.

8. A method according to claim 2, wherein the temporal correlations comprise two or more pixels changing within a pre-defined time period of each other.

9. A method according to claim 8, wherein the temporal correlations comprise two or more pixels changing substantially simultaneously.

10. A method according to claim 1, wherein, prior to step c), the method comprises:
    generating a model of the GUI of the system under test to identify one or more correlations between pixels of the GUI of the system under test.

11. A method according to claim 10, wherein the model comprises a direct copy of the GUI of the system under test.

12. A method according to claim 10, wherein the model comprises a transformation of the GUI of the system under test.

13. A method according to claim 12, wherein the transformation may comprise one or more of: a dimensional scaling of the GUI of the system under test; a color transform; a mathematical transform; or a reduced form of the GUI of the system under test.

14. A method according to claim 13, wherein a reduced form of the GUI of the system under test may comprise one or more of: the removal of text or removal of borders.

15. A method according to claim 10, wherein the step of modelling is carried out on the test computer system.

16. A method according to claim 10, wherein the step of modelling comprises dynamically modelling the pixels of the GUI of the system under test.

17. A method according to claim 1, further comprising:
    g) utilising the updated test description in an automated computer test.

18. A non-transitory computer readable medium comprising instructions configured when executed to perform a method for updating a test description for an automated computer test, the automated test being configured, when executed, to cause a test computer system to communicate with a system under test comprising one or more computer programs being executed upon a computer device, wherein the test description is configured to be executed by a test program to cause the test computer system to perform an automated computer test by comparing a received image from a GUI of the system under test with one or more reference images to identify an expected image, wherein the method comprises:
    a) receiving a user input representative of the selection of at least one pixel of a desired reference image from a GUI of a system under test; and
    b) automatically obtaining the desired reference image by:
    c) identifying one or more correlations between the at least one selected pixel and one or more adjacent pixels of the GUI of the system under test to determine a group of pixels corresponding to the desired reference image;
    d) determining the image boundaries of the desired reference image based the determined group of pixels and/or any identified correlations;
    e) capturing the desired reference image delimited by the determined image boundaries; and
    f) updating the test description with the captured reference image.

19. A computer system comprising: a processing device, a storage device and a non-transitory computer readable medium comprising instructions configured to perform, when executed, a method for updating a test description for an automated computer test, the automated test being configured, when executed, to cause a test computer system to communicate with a system under test comprising one or more computer programs being executed upon a computer device, wherein the test description is configured to be executed by a test program to cause the test computer system to perform an automated computer test by comparing a received image from a GUI of the system under test with one or more reference images to identify an expected image, wherein the method comprises:
   a) receiving a user input representative of the selection of at least one pixel of a desired reference image from a GUI of a system under test; and
   b) automatically obtaining the desired reference image by:
   c) identifying one or more correlations between the at least one selected pixel and one or more adjacent pixels of the GUI of the system under test to determine a group of pixels corresponding to the desired reference image;
   d) determining the image boundaries of the desired reference image based the determined group of pixels and/or any identified correlations;
   e) capturing the desired reference image delimited by the determined image boundaries; and
   f) updating the test description with the captured reference image.

* * * * *